(12) United States Patent  
Cobzaru et al.

(10) Patent No.: US 7,665,342 B2
(45) Date of Patent: Feb. 23, 2010

(54) COMPACT UNIVERSAL OFFSET PULLING HEAD FOR FASTENERS

(75) Inventors: Cristinel Ovidiu Cobzaru, Murrieta, CA (US); Karthikeyan Pichaikannu, Orange, CA (US)

(73) Assignee: SPS Technologies, LLC, Santa Ana, CA (US)

( * ) Notice: Subject to any disclaimer, the term of this patent is extended or adjusted under 35 U.S.C. 154(b) by 0 days.

(21) Appl. No.: 12/156,558

(22) Filed: Jun. 2, 2008

(65) Prior Publication Data

US 2009/0293250 A1 Dec. 3, 2009

(51) Int. Cl.
*B21J 15/10* (2006.01)

(52) U.S. Cl. ................ 72/391.2; 72/391.8; 29/243.522; 29/243.529

(58) Field of Classification Search ................. 29/243.521–243.524, 243.529; 72/114, 72/391.2, 391.6, 391.8
See application file for complete search history.

(56) References Cited

U.S. PATENT DOCUMENTS

| | | | |
|---|---|---|---|
| 3,713,321 A * | 1/1973 | LaPointe | 29/243.524 |
| 4,615,206 A * | 10/1986 | Rosier | 29/243.523 |
| 4,796,455 A | 1/1989 | Rosier | |
| 4,813,216 A | 3/1989 | Day et al. | |
| 4,813,261 A * | 3/1989 | Rosier | 29/243.522 |
| 4,896,522 A * | 1/1990 | Rosier | 29/243.521 |
| 5,208,959 A | 5/1993 | Rosier et al. | |
| 5,371,933 A * | 12/1994 | Godfrey | 29/243.529 |
| 5,519,926 A | 5/1996 | Rosier | |
| 6,662,420 B1 * | 12/2003 | Rosier | 29/243.529 |
| 6,739,170 B1 | 5/2004 | Rosier | |
| 7,467,451 B2 * | 12/2008 | Cobzaru et al. | 29/243.521 |

* cited by examiner

*Primary Examiner*—David B Jones
(74) *Attorney, Agent, or Firm*—James M. Duncan, Esq.; Klein, DeNatale, et al.

(57) ABSTRACT

A universal offset pulling head assembly for exerting an axial pulling force on a fastener allows the same pulling head assembly to be utilized for a variety of different fastener sizes and types by exchanging a front plate assembly, where the front plate assembly may comprise variable nose pieces according to the type of fastener to be installed. Because the front plate assembly is subject to the most severe wear, other components of the pulling head assembly may continue to be utilized and the front plate assembly discarded. The disclosed pulling head assembly utilizes a stationary guiding member which prevents damage which might otherwise occur because of severe bending moments.

18 Claims, 15 Drawing Sheets

COMPACT UNIVERSAL OFFSET PULLING HEAD FOR FASTENERS

BACKGROUND OF THE INVENTION

This invention generally relates to the installation of fasteners, including blind fasteners, and anchoring devices such as rivetless nut plates, which are used in manufacturing, maintenance and repair of aircraft, as well as in countless commercial applications. Such fasteners are installed by placing the fastener into an opening extending through the piece or pieces to be fastened and then applying a load to a male member, known as the break stem, which is initially attached to the fastener. The break stem shears from the fastener body at the end of the installation process upon the application of a predetermined tensile load by an installation tool.

The invention more specifically relates to fasteners used in confined areas which are usually installed using offset installation equipment. While the idea of offset installation is not new, decreases in the available space for installation results in a concomitant increase in the need for reduced sizing of the installation tool. This increased need has resulted in an increased demand for more compact offset and right-angle pulling heads for operation at concurrently increasing loads.

Examples of areas which present difficulties in installing fasteners include those which are close to other structures or to an edge, structure obstructed access, and blind access areas, as in the case of an fastener installed in a C-channel. Standard straight pulling head tools are usually unable to install fasteners in such applications.

Under known practices, pulling heads, including their nose assemblies, are typically custom designed to install fasteners of specific types and sizes. As construction of an aircraft requires the use of hundreds of types and sizes of fasteners, the procurement and use of the corresponding pulling heads can become expensive, unnecessarily complicating the logistics of production and procurement.

By way of background for pulling heads, U.S. Pat. Nos. 4,796,455 and 6,739,170 B1, both by Rosier, disclose offset nose assemblies, which because of the compact nature and configuration of the nose assembly, increase the applications where use of pulling heads is feasible. However, the devices disclosed by Rosier are dedicated to a single type and size of fastener and are not capable of being reconfigured. As a result, nose assemblies for uncommon types or sizes of fasteners are either unavailable or only available at an increased expense and a longer order lead time than for the more common fasteners. Additionally, because pulling heads tend to jam during operation and prolonged use only exacerbates this tendency, the currently known pulling heads have a relatively short life cycle, as when the active areas of a tool wear out, such that the tool has to be disposed.

SUMMARY OF THE INVENTION

The present application is directed toward an apparatus which addresses the problems identified above.

The presently disclosed device is a compact re-configurable pulling head which is capable of use for installing a wide variety of fastener types and sizes. This concept decreases the manufacturing cost of the tool, resulting in savings which may be ultimately passed to the consumer of the finished goods. Additionally, because a single pulling head may be utilized for a variety of fastener types and sizes, the number of tools required for manufacturing may be decreased, with concomitant decreases in the logistics of manufacturing, stocking and procurement of the needed tools.

The disclosed device uses lower cost, easily replaceable wear components and thus can be repaired and refurbished when the use areas are worn as opposed to the entire pulling head being discarded and replaced.

The disclosed pulling head comprises a housing having a front end and a rear end, a drawbolt having an upper section and a lower section, a drawbolt activation means, a removable front plate, a stationary guiding member, a nose piece, and a break stem gripping means. The front plate is attached to the housing with front plate retention means. The housing comprises a first axis, while the gripping means define a second axis parallel to the first axis. The lower section of the drawbolt, which is disposed within the housing, comprises a guide member engagement surface which slideably engages the stationary guiding member.

Because the present device has an interchangeable front plate, the front plate can be replaced either when the front plate is excessively worn or, alternatively, when it is desired to install a different type of fastener. Front plates for different fasteners may comprise a integral nose pieces sized for a particular fastener size and type. Alternatively, the nose piece may be removeably attached to the front plate, such that the operator may change out the nose piece as required for the particular fastener. As the front plate and/or the nose piece can be manually replaced by the operator, the same pulling head may be utilized to provide for the installation of different fasteners by simply changing out the front plate and/or the nose piece.

A consideration for the known offset pulling heads is that operation generates a bending moment which negatively impacts tool performance. If the bending moment is not properly controlled, resulting component failure can occur. Additionally, increasing installation loads as well as increasing offset distance generate increasing bending moments. Improved guiding systems are therefore required to prevent damage caused by the bending moment. Embodiments of the disclosed device comprise an improved guidance mechanism, namely a stationary guide member, to reduce the effects of the bending moment. The stationary guiding member guides the drawbolt during fastener placement and installation, thus ensuring that correct placement and installation of the fastener is not affected by the stress of the bending moment. The guide member may comprise a precision pin having very high surface hardness and thus able to withstand the shearing effects of the bending moments generated during use. The stationary guiding member may be an integral component of the front plate, or attached thereto. When the front plate is attached to the housing of the tool, the guider member is disposed within the housing of the pulling head, providing support to the drawbolt. Additionally, the stationary guiding member provides no threat of harm to the operator or the structure to which the fastener is being installed (such as an aircraft), because the guiding member has no moving or operative protruding parts.

The front plate retention means can be a threaded fastener of a predetermined size and type of manufacture and more than one fastener may be used, depending upon the desired characteristics and requirements of use. Additionally, the stationary guide member may itself be utilized as means for retaining the front plate to the housing.

The upper section of the drawbolt comprises gripping means, which may comprise a plurality of jaws. The plurality of jaws grips the break stem of the fastener during installation and transmits the load from the drawbolt to the break stem to shear the break stem.

DETAILED DESCRIPTION OF THE EMBODIMENTS

Figure 1:
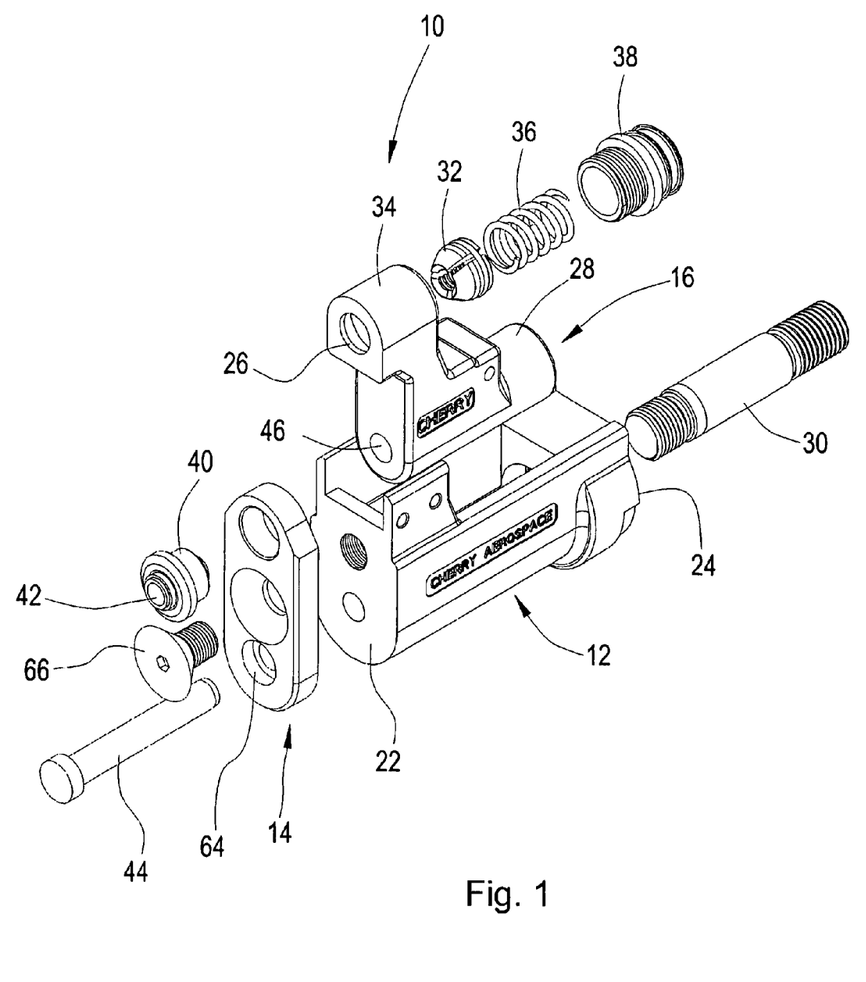
FIG. 1 shows an exploded perspective view of an embodiment of the disclosed apparatus.
Figure 2:
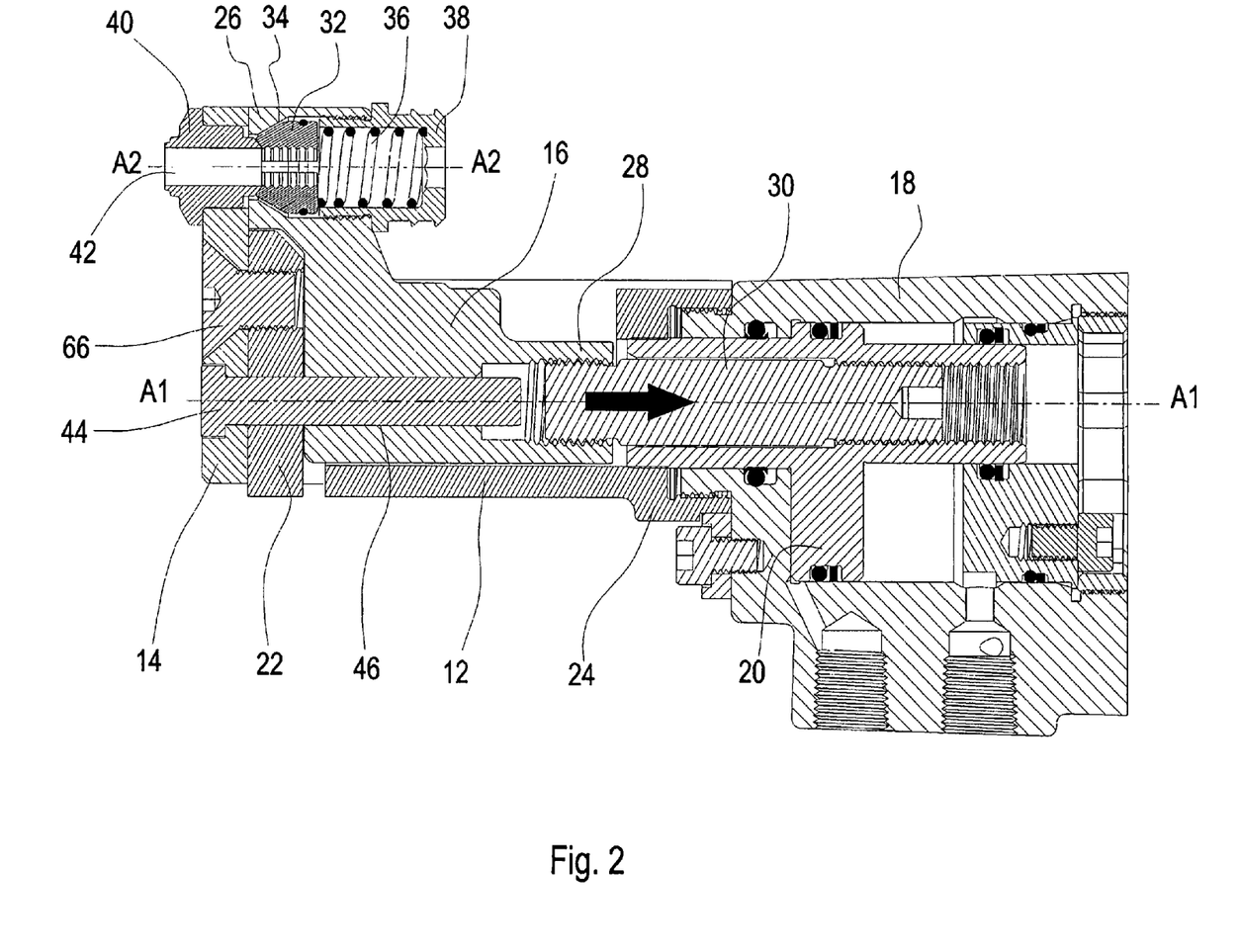
FIG. 2 shows a cross sectional view of the embodiment shown in FIG. 1.

Referring now to the figures, FIG. 1 shows the major components of an embodiment of the device 10. As shown, the device 10 generally comprises the housing 12, the front plate 14 and the drawbolt 16. The housing 12 and attached front plate 14 are the stationary portions of the device, providing an active area to interface with a fastener during installation. The drawbolt 16 is the mobile part of the device, providing means to grip onto the fastener and providing the pulling force to install the fastener. As shown in FIG. 2, the housing 12 is threaded to the head cylinder 18 of a riveter, also referred to herein as the "actuation means." The drawbolt 16 is operationally connected to the piston 20 of the riveter.

Housing 12 has a front end 22 and a rear end 24. The front end 22 and the rear end 24 of the housing 12 define a first axis $A_1$ as shown in FIG. 2. Drawbolt 16 comprises an upper section 26 and a lower section 28, the lower section 28 disposed within the housing 12. The drawbolt 16 is connected to an actuation member 30, which in turn is operated by the actuation means for axial movement of the drawbolt 16 relative to the housing 12 and along the first axis $A_1$.

The upper section 26 of the drawbolt 16 comprises a gripping means, such as jaws 32 which are disposed within jaw housing 34. Jaws 32 are biased forward within jaw housing 34 by biasing means such as a spring 36 (or a rubber grommet) which is retained by plug 38. Jaws 32 are in axial alignment with the central axis of nose piece 40, thereby defining a second axis $A_2$, as shown in FIG. 2. The second axis $A_2$ is parallel to the first axis $A_1$.

Figure 13:
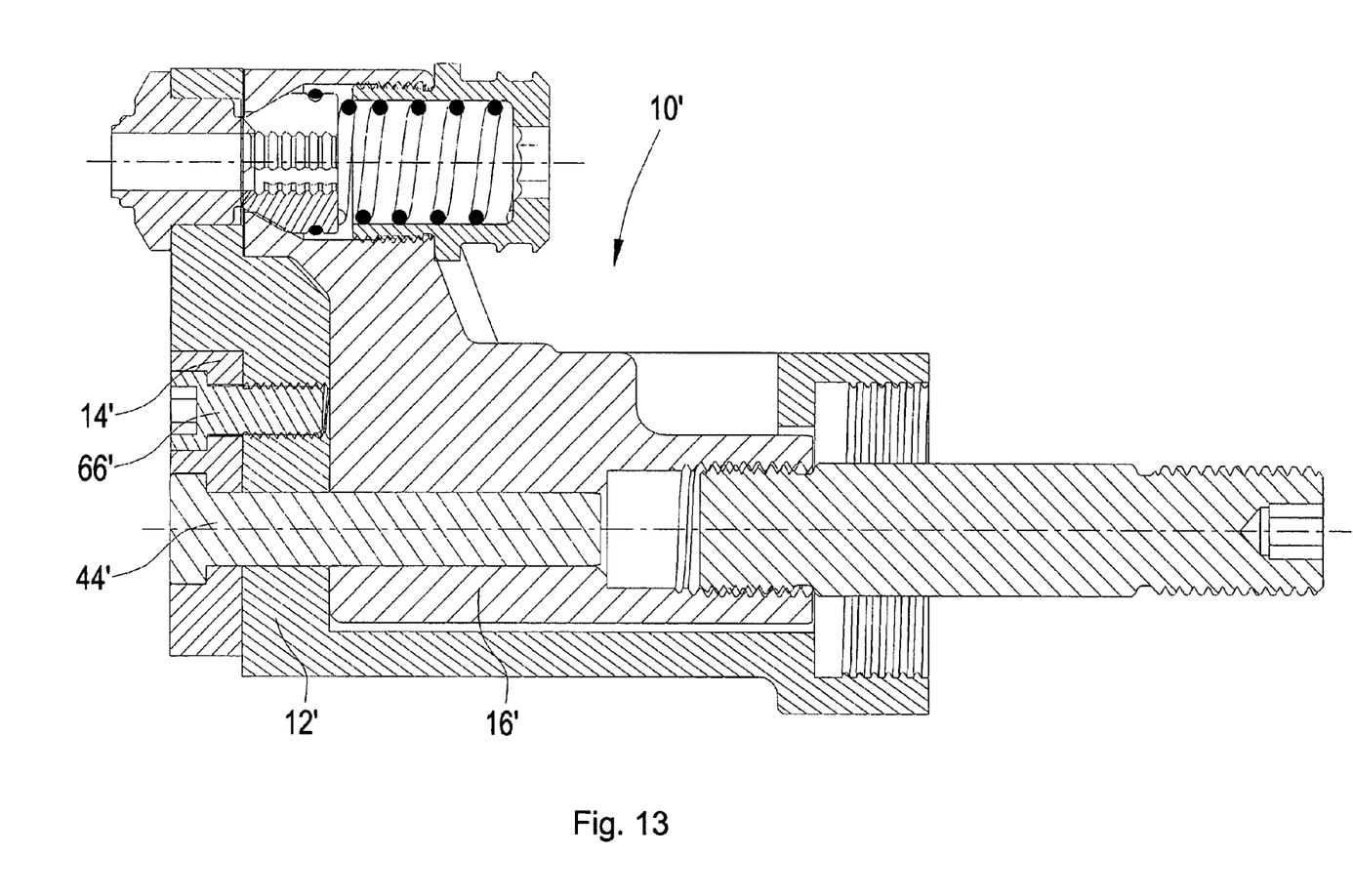
FIGS. 13 and 13a show a sectional view and a perspective view of an alternative embodiment of the disclosed apparatus.
Figure 13A:
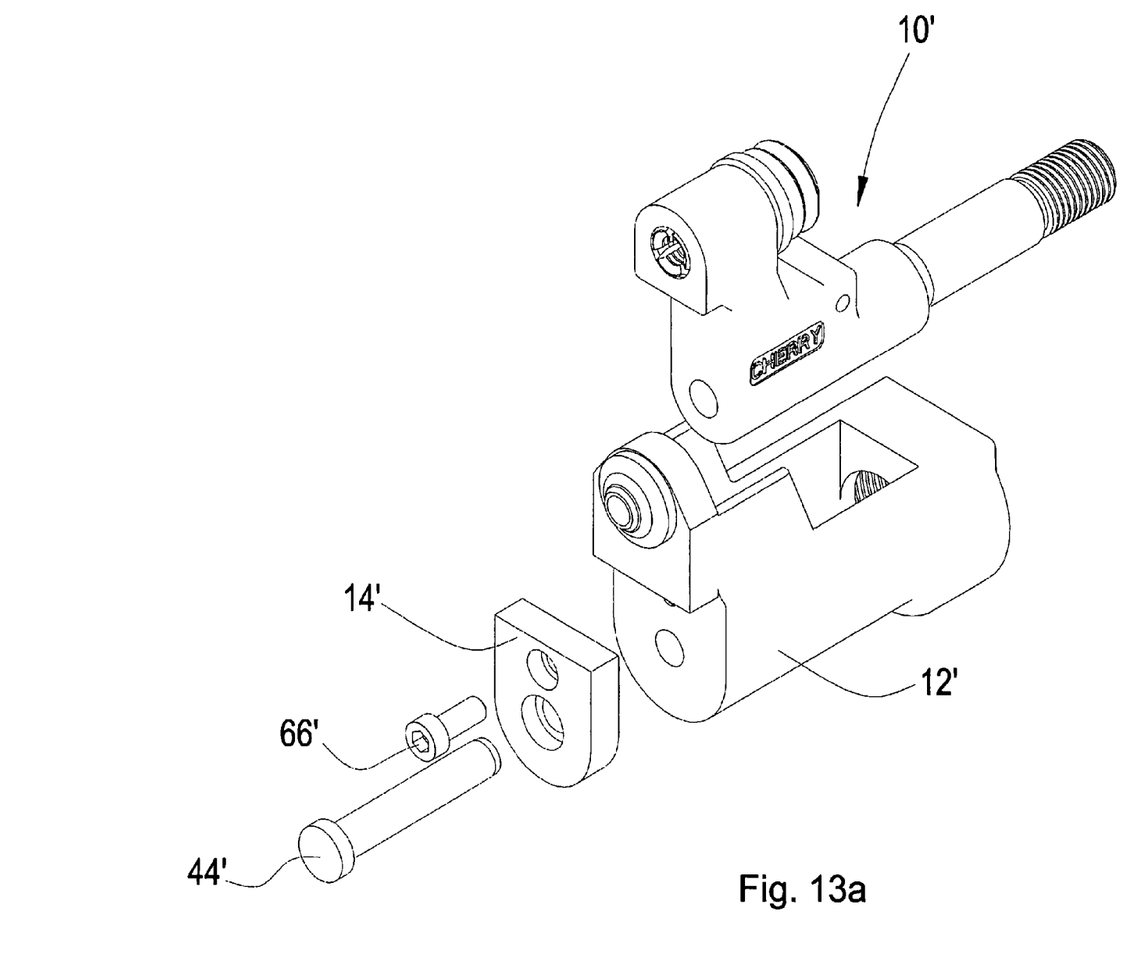

Front plate 14 is removably attached to the front end 22 of housing 12 with retention means such as screw 66 or other suitable fastener which typically will allow for changing of the front plate on site by the operator. The front plate 14 may comprise a nose piece 40 having an aperture 42. However, as shown in FIGS. 13 and 13a, the nose piece 40 may, alternatively, be attached to an alternative embodiment of housing 12'. The axis of the aperture 42 coincides with the second axis $A_2$. The front plate 14 further comprises a stationary guiding member 44, which may be set within a counter-bore 64, where the stationary guiding member 44 axially extends into the housing 12 when the front plate is attached to the housing. The lower section 28 of drawbolt 16 comprises a guide member engagement surface 46 which slideably engages a portion of the stationary guiding member 44 as the drawbolt 16 axially moves relative to the housing 12, as indicated by the arrow shown in FIG. 2. Guide member engagement surface 46 may comprise a portion of the inside surface of an aperture axially extending through the lower section 28 of drawbolt 16 as shown in FIG. 1.

During the operating cycle of the installation tool, the drawbolt 16 is precisely guided by the stationary guiding member 44. Stationary guiding member 44 is preferably manufactured from tough and durable materials having a very hard surface. Stationary guiding member 44 serves multiple functions. It provides accurate location of front plate 14 with respect to housing 12. It provides accurate location of the drawbolt 16 with respect to nose piece 40, which is critical for the correct installation of a fastener. The stationary guiding member 44 guides the drawbolt 16 during operation, protecting the assembly against the destructive effects of the bending moments generated during fastener installation.

Figure 3:
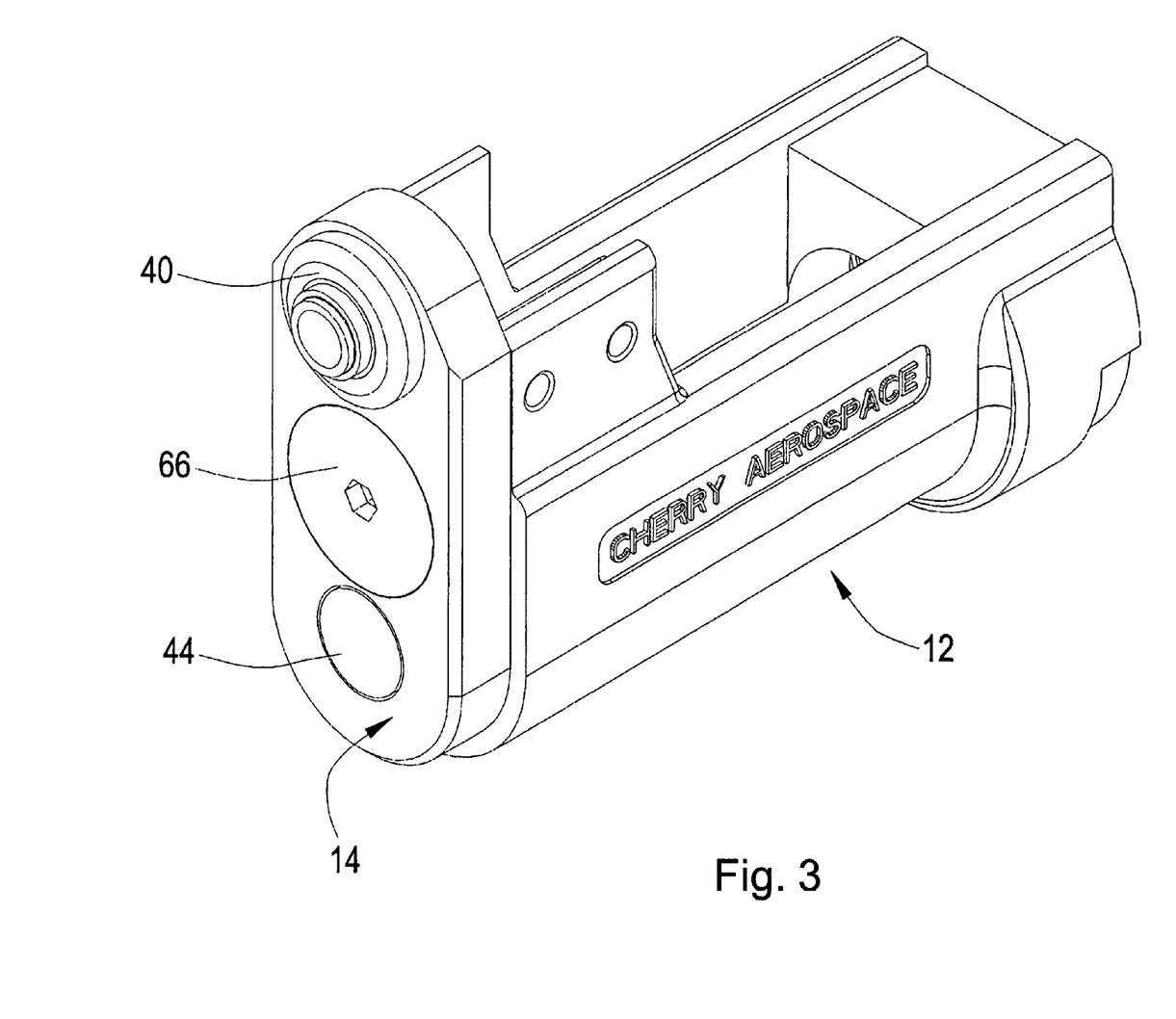
FIG. 3 shows a perspective view of the housing and front plate of the embodiment shown in FIG. 1.
Figure 4:
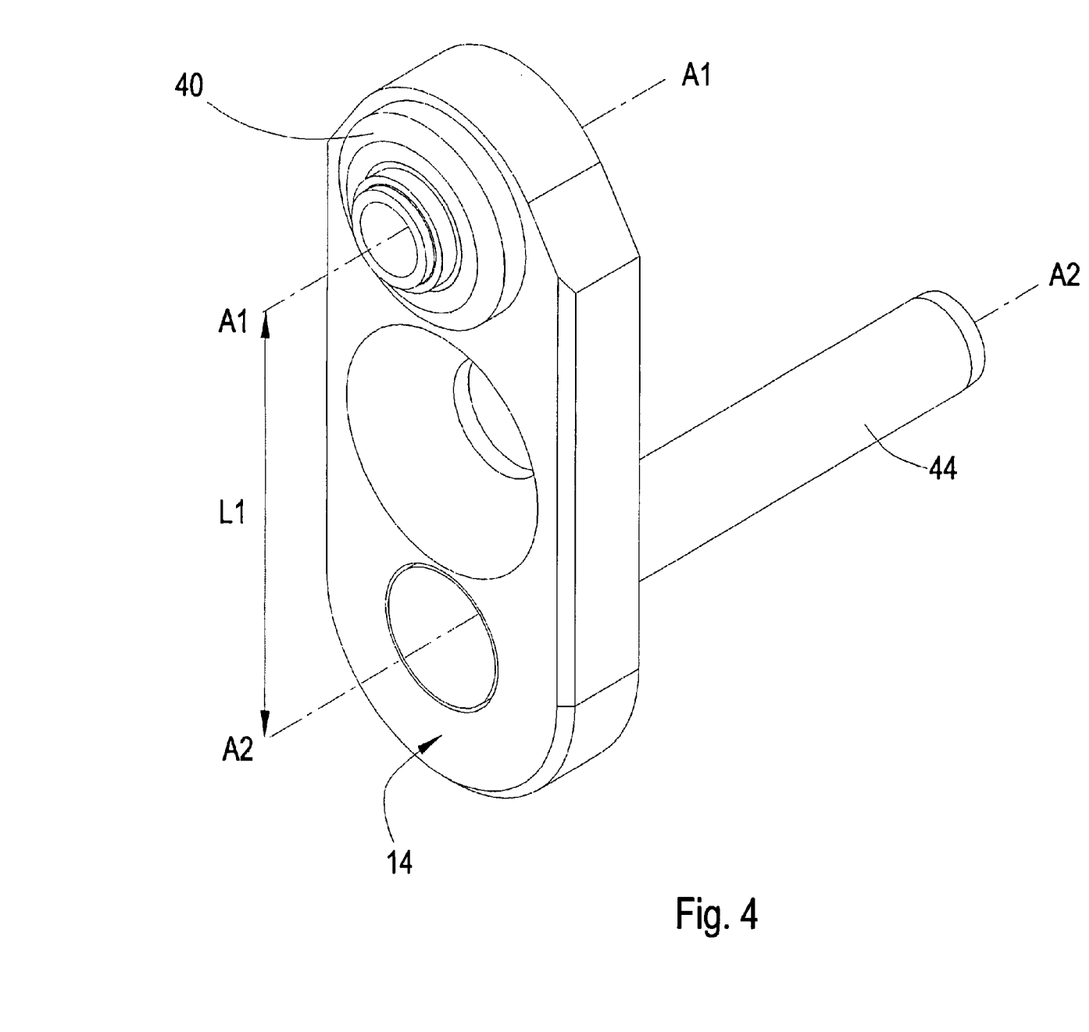
FIG. 4 shows perspective view of the front plate of the embodiment shown in FIG. 1.

FIG. 3 shows a perspective view of an embodiment of housing 12 with front plate 14 attached with screw or other suitable fastener 66. Front plate 14 further comprises nose piece 40. Nose piece 40 is the component which interfaces with the fastener during installation, and is typically a high wear component. As shown in FIG. 3, stationary guiding member 44 may be pressed flush into the front plate 14. Housing 12 and front plate 14 are maintained in a generally stationary position during the operational cycle of the installation tool. FIG. 4 shows a perspective view of an embodiment of front plate 14 detached from housing 12, showing stationary guiding member 44, which is in axial alignment with first axis $A_1$. The distance $L_1$ between first axis $A_1$ and second axis $A_2$ defines the offset of the pulling head. Nose piece 40 and stationary guiding member 44 are typically pressed into front plate 14. However, it is to be appreciated that other means of attaching either component to the front plate 14 may be utilized, such as threads, or, alternatively, the nose piece and/or stationary guiding member 44 may be integral components of front plate 14. Alternatively, as shown in FIGS. 13 and 13a, nose piece 40 may be attached to an alternative embodiment of housing 12'.

Figure 5:
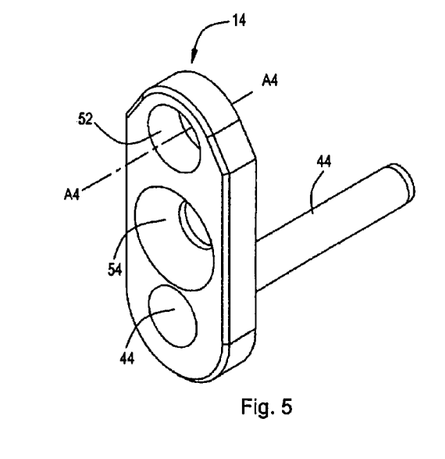
FIG. 5 shows perspective view of the front plate of FIG. 4 with the nose piece removed.
Figure 6A:
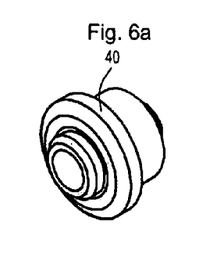
FIGS. 6a-6i show perspective views of various nose pieces which may be utilized in combination with the front plate shown in FIG. 5.
Figure 6B:
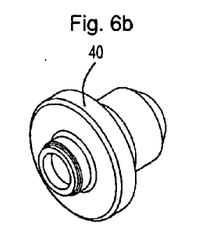
Figure 6C:
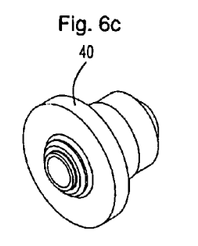
Figure 6D:
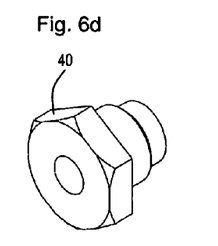
Figure 6E:
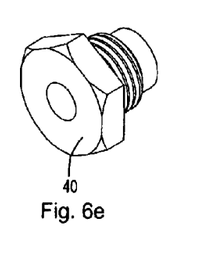
Figure 6F:
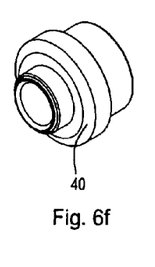
Figure 6G:
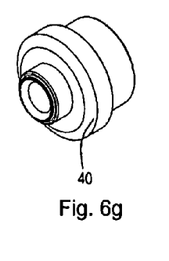
Figure 6H:
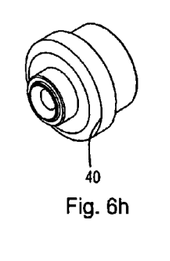
Figure 6I:
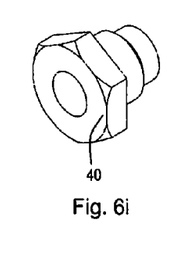

FIG. 5 depicts the front plate 14 with the nose piece 40 removed, showing aperture 52 into which nose pieces 40 of different configurations may be set. It is this feature which allows a single pulling head to be utilized for a large variety of different fasteners and sizes. By changing either front plate 14 or, alternatively, changing the nose piece 40 in the front plate or housing 12', the same pulling head may be utilized for many different fasteners. In addition, because the front plate 14 comprises the high wear components of the device, a worn front plate may be discarded while the remaining components of the pulling head have remaining service life. FIGS. 6a through 6i depict a variety of embodiments of the nose piece 40 which may be disposed within aperture 52 of front plate 14. The nose piece 40 may be pressed into the aperture 52 or otherwise attached to the front plate 14. Front plate 14 is attached to housing 12 with retention means which are inserted through attachment aperture 54 of front plate 14.

Figure 7:
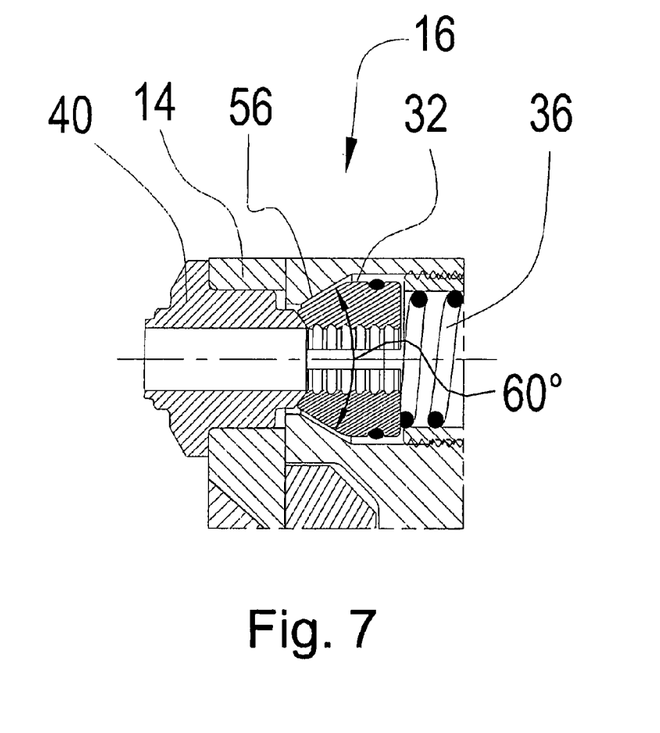
FIG. 7 shows a partial cross sectional view of the front plate and the drawbolt assembly of an embodiment of the disclosed apparatus in the pre-operative condition.
Figure 8:
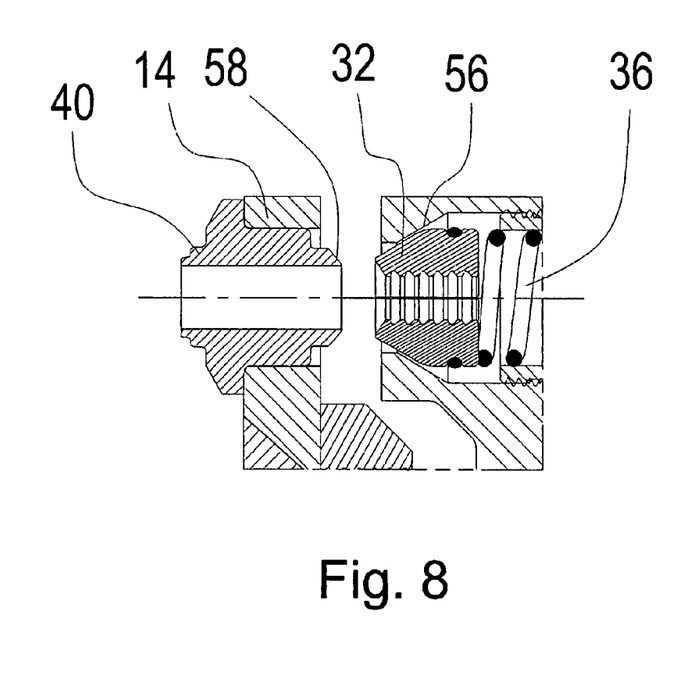
FIG. 8 shows a partial cross sectional view of the front plate and the drawbolt assembly of an embodiment of the disclosed apparatus with the drawbolt being activated.
Figure 9:
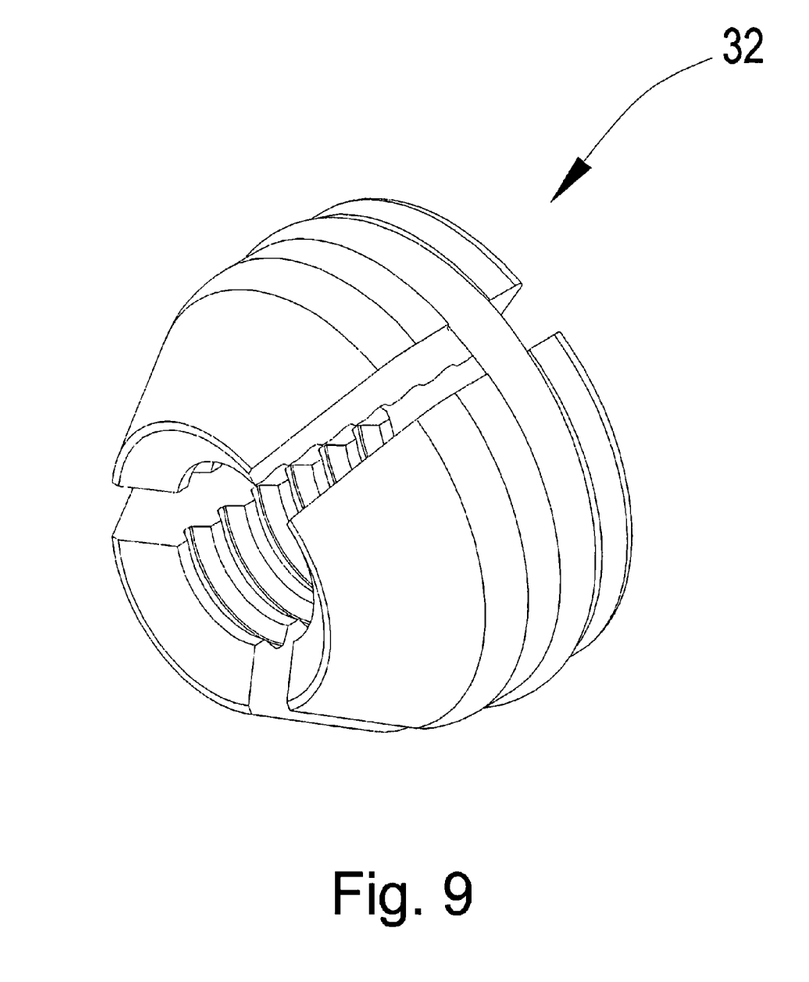
FIG. 9 shows a perspective view of the jaw members which may be utilized in an embodiment of the disclosed apparatus.

FIGS. 7 through 9 show detailed views of the configuration of jaws 32 As shown in FIG. 9, jaws 32 may comprise three segments which, when assembled comprise a conical front shape. This conical shape matches the internal shape of the drawbolt cavity 56. The angle of the front of the jaws 32 affects the engagement of the jaws onto the stem 100 of a fastener member, and the disengagement of the jaws from the stem. Nose piece 40 comprises a conical back end 58 which, when the drawbolt 16 is in the forward position as shown in FIG. 7, pushes jaws 32 slightly back, compressing spring 36 or other biasing means and opening the jaws for receiving stem 100 (not shown). When the actuation means is activated, as illustrated in the active area detail FIG. 8, drawbolt 16 begins to move backward away from the nose piece 40 and the front of the jaws 32 disengage from the conical back end 58 of the nose piece, at which point the jaws are urged forward by spring 36 or other biasing means, such as an elastic element. In moving forward against the front of the drawbolt cavity 56, the jaws 32 are forced closed by the conical shape of the drawbolt cavity 56, thereby locking onto stem 100. When the actuation means is deactivated, the drawbolt 16 moves forward against the conical back end 58 of the nose piece 40 thereby releasing jaws 32 from the stem 100.

It has been found that the angle for the front of the jaws 32, and the matching angle of the drawbolt cavity 56 should exceed forty-five degrees and that the optimal angle is sixty degrees, as depicted in FIG. 7. The use of a sixty degree angle has been found to be optimum for high performance, increased life of the jaws 32 and drawbolt 16, and rapid engagement/disengagement of the jaws with stem 100, especially when installing fasteners requiring high installation loads. A more standard angle of 36 degrees may also be used.

As illustrated in the examples provided below, the disclosed invention provides the ability to utilize a single pulling head to install completely different sizes and varieties of fasteners simply by changing out the front plate 14 and/or the nose piece 40. While three different examples are provided below, it is to be appreciated that the applications for the presently disclosed invention apply to many other types of fasteners and the following applications are provided as examples only rather than an exhaustive list of applications.

Figure 10A:
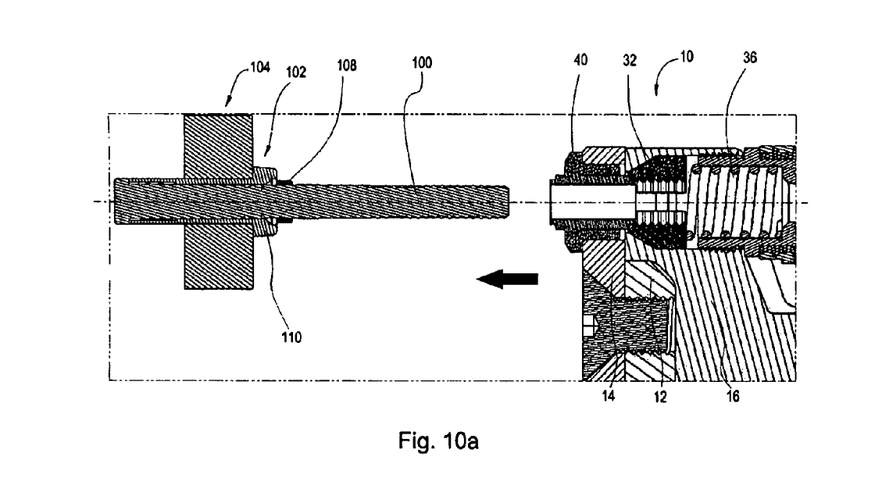
FIGS. 10a through 10g show the operational sequence of an embodiment of the disclosed apparatus in the installation of a blind bolt fastener.
Figure 10B:
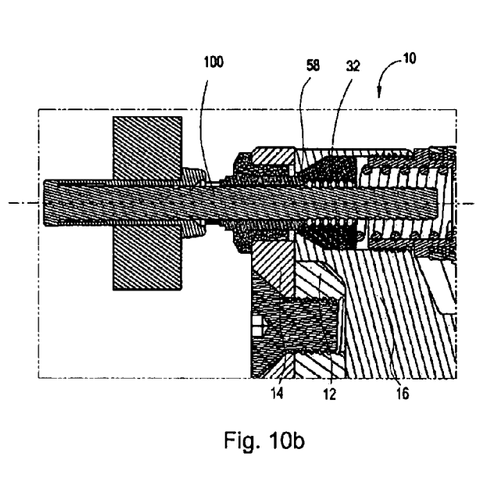
Figure 10C:
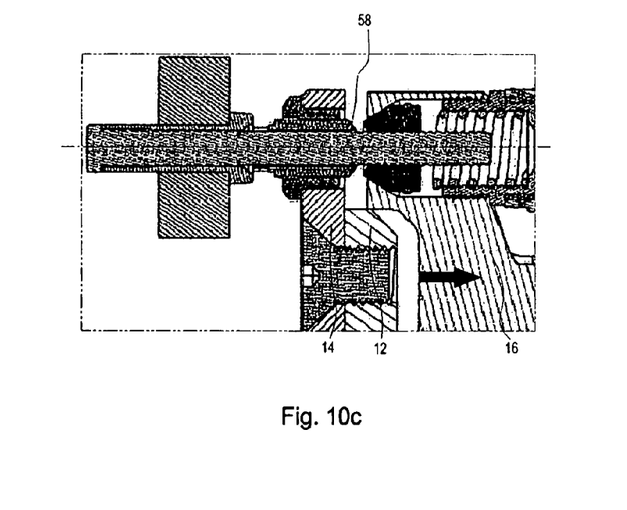
Figure 10D:
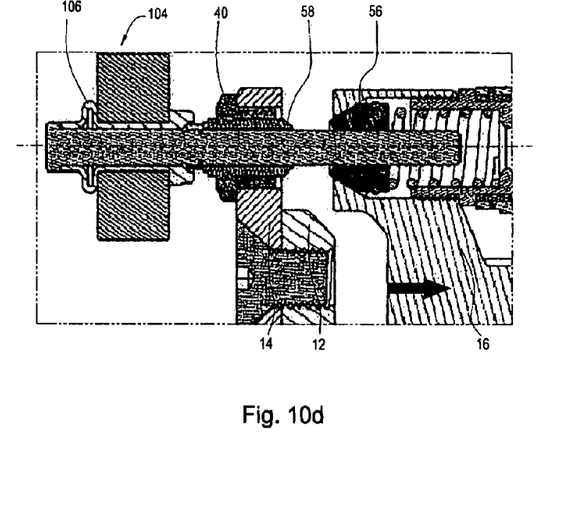
Figure 10E:
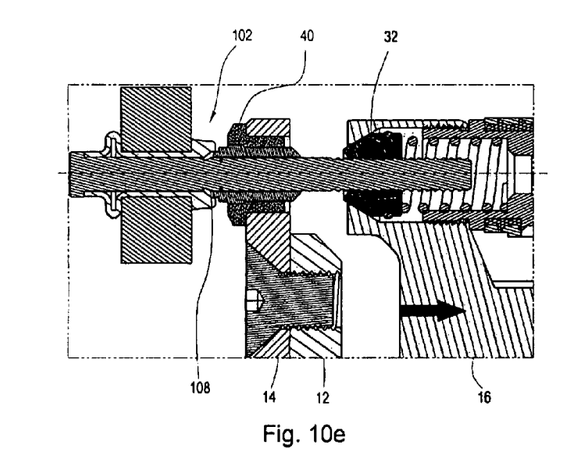
Figure 10F:
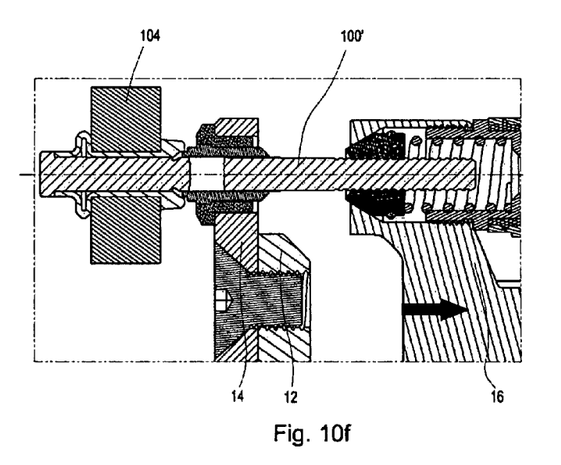
Figure 10G:
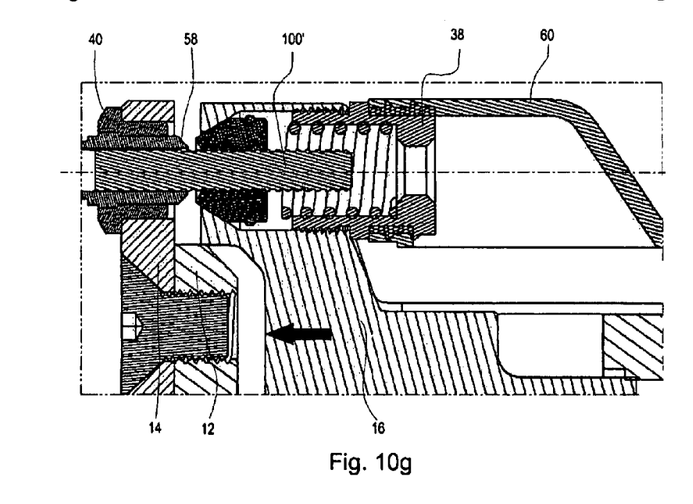

FIGS. 10a through 10g show the stages of installation of a blind bolt fastener with an embodiment of the device 10. FIG. 10a shows the initial stage of installation with the blind fastener 102 placed in an aperture in the structure 104. The device 10 has previously been equipped with a front plate 14 and/or nose piece 40 specific to the fastener 102 to be installed. With jaws 32 held in an open position by the conical back end 58 of the nose piece 40, the nose piece is positioned onto the fastener stem 100 as shown in FIG. 10b. The trigger of the riveter is pressed, causing the drawbolt 16 to pull away from the conical back end 58 of nose piece 40 as shown in FIG. 10c. Once jaws 32 have been pulled away from the conical back end 58 of nose piece 40, the jaws 32 are urged forward by spring 36 against the conical shape at the front of the drawbolt cavity 56 which forces the jaws to close and lock onto stem 100. Once the jaws 32 have fully engaged stem 100, the stem is pulled toward the pulling head, thereby forming bulb 106 on the blind side of the structure 104. As illustrated in FIG. 10e, when the required load is reached, nose piece 40 deforms the locking collar 108 (best shown in FIG. 10a) of the blind fastener 102 by wedging the locking collar between the sleeve 110 of the fastener and the stem 100, thereby fully installing the blind fastener. Once the blind fastener 102 is fully installed, additional load applied by the installation tool breaks stem 100, such that a stem remnant 100' remains in the jaws 32 as shown in FIG. 10f. As shown in FIG. 10g, when the trigger of the installation means is released, the drawbolt 16 returns to its original position and the jaws 32 are released by engaging the conical back end 58 of the nose piece 40. The stem remnant 100' is thereby released by the jaws 32 but not ejected. When the nose piece 40 is placed over the next fastener stem 100 to be installed, the stem remnant 100' is pushed out of the jaws 32 through an opening in plug 38 into deflector 60.

Figure 11A:
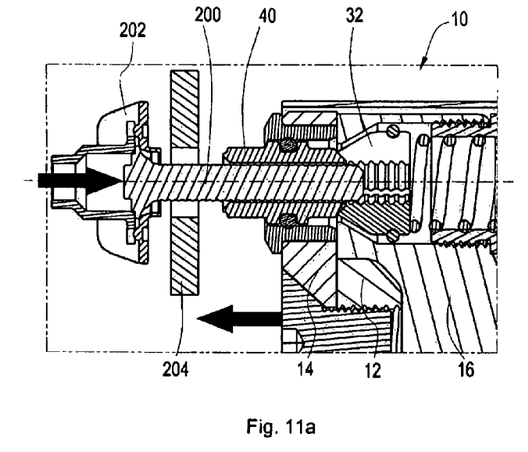
FIGS. 11a through 11d show the operational sequence of an embodiment of the disclosed apparatus in the installation of a rivetless nut plate installation.
Figure 11B:
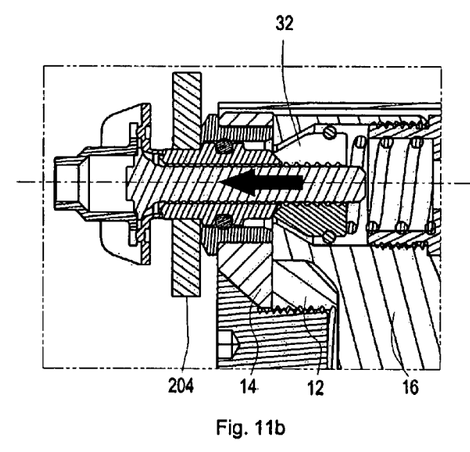
Figure 11C:
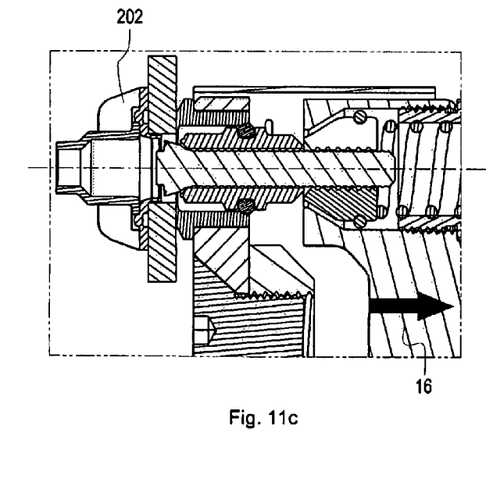
Figure 11D:
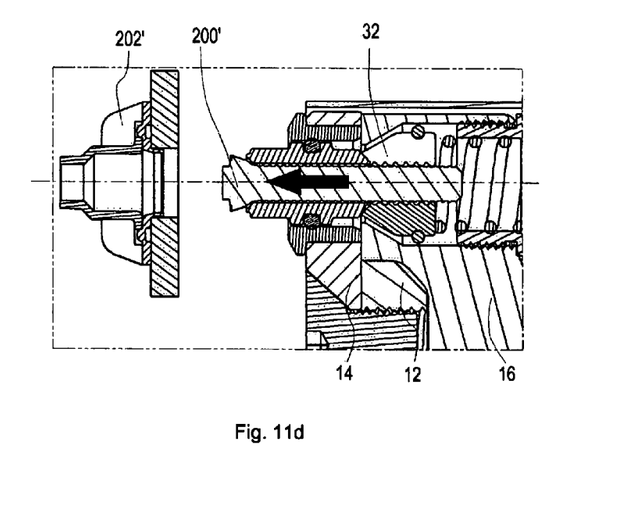

FIGS. 11 through 11d show the stages of installation of a rivetless nut plate ("RNP") assembly 202 with an embodiment of the device 10. The RNP assembly 202 is a different type of fastener from blind fastener 102, because access is available on the other side of the structure 204. As shown in FIG. 11a, nose piece 40 is placed over mandrel 200, with the nose piece penetrating the structure 204. When the actuation means are activated, the draw bolt 16 pulls away causing the jaws 32 to clamp down on mandrel 200. The retainer of the RNP assembly 202 is pulled into the structure 204, and the mandrel 200 begins to collapse expanding the retainer into the structure as shown in FIG. 11c. Continued load applied to the mandrel 200 causes it to detach from the RNP assembly 202', leaving a mandrel remnant 200' in jaws 32. As shown in FIG. 11d, the mandrel remnant 200' is returned to the front of the tool where it may be manually ejected.

Figure 12A:
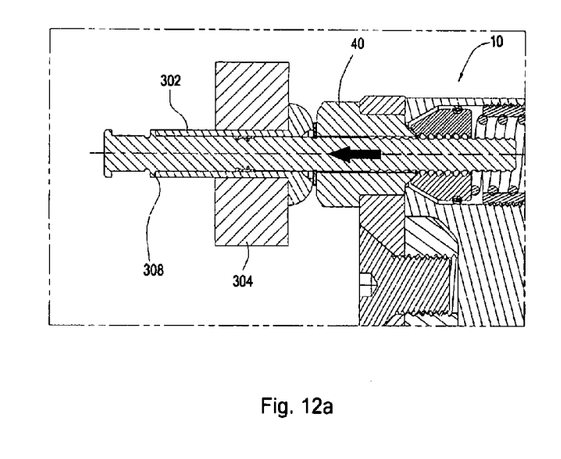
FIGS. 12a through 12d show the operational sequence of an embodiment of the disclosed apparatus in the installation of a rivet.
Figure 12B:
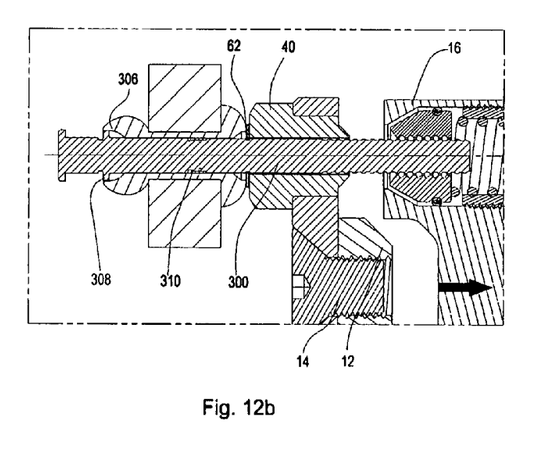
Figure 12C:
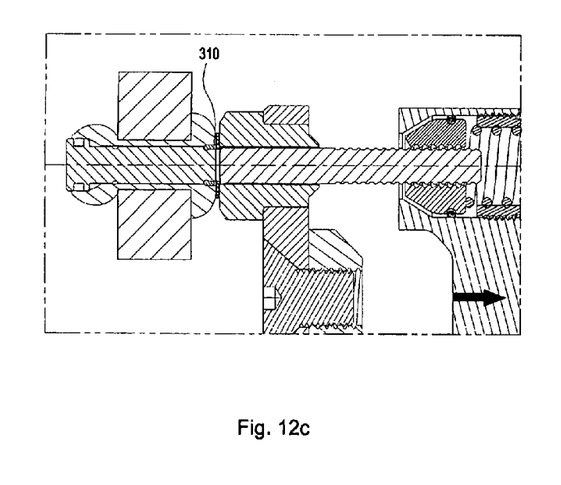
Figure 12D:
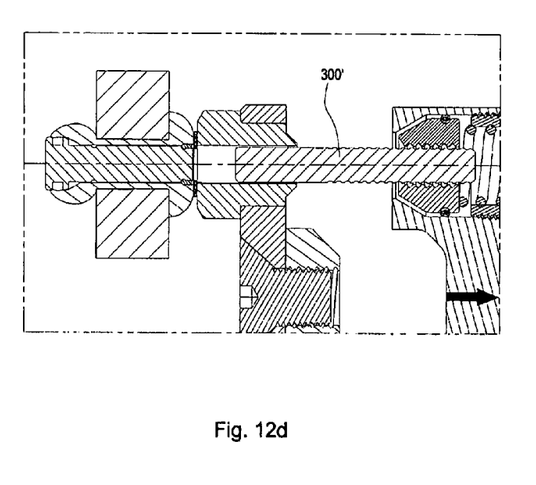

FIGS. 12a through 12d show the stages of installation of a rivet-type fastener 302 with an embodiment of the device 10. As shown in FIG. 12a, nose piece 40 is placed over rivet stem 300, with the nose piece 40 abutting the head of the rivet. When the actuation means are activated, the draw bolt 16 pulls away causing the jaws 32 to clamp down on rivet stem 300. As the rivet stem 300 is pulled backward by drawbolt 16, a shear ring 308 on the stem collapses the sleeve of the rivet 302 forming bulb 306. As the rivet stem 300 continues to move through the sleeve of the rivet 302, the shear ring 308 shears off of the stem, allowing a locking collar 310 to contact the driving anvil 62 at the front of nose piece 40. The locking collar 310 fills the recessed area between the rivet stem 300 and the sleeve which secures them together. Continued pulling by the drawbolt 16 causes the rivet stem 300 to fracture from the rivet fastener.

Because different application may present access issues, the geometry of the front plate 14 of the pulling head may impact whether the tool is suitable for use in the application. Therefore, the following embodiments of the invention present modified front plate arrangements having different profiles. These embodiments may also present advantages to an operator not realized by the embodiments disclosed above, such as easier or faster field replacement of the front plate. In addition, the following embodiments discuss modifications to the stationary guide member 44 which may, in a particular application, be desirable.

FIGS. 13 and 13a show an alternative embodiment of the pulling head 10'. In this embodiment, the short front plate 14' comprises a stationary guiding member 44' in the form of a dowel pin, but the nose piece 40 is retained in housing 12' rather than in front plate 14 as shown in the other embodiments. Front plate 14' further comprises fastener 66'.

Figure 14:
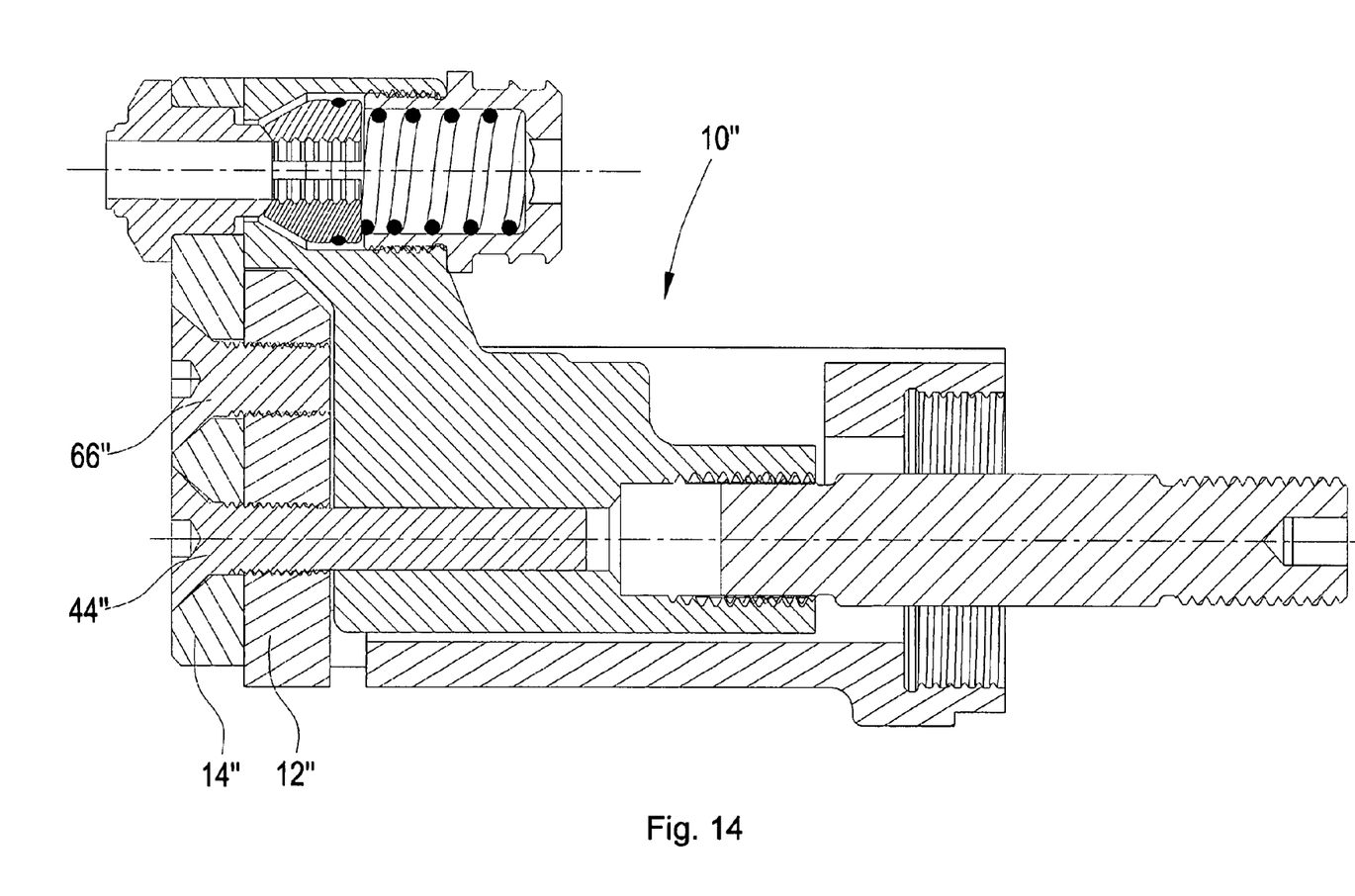
FIGS. 14 and 14a show a sectional view and a perspective view of an alternative embodiment of the disclosed apparatus.
Figure 14A:
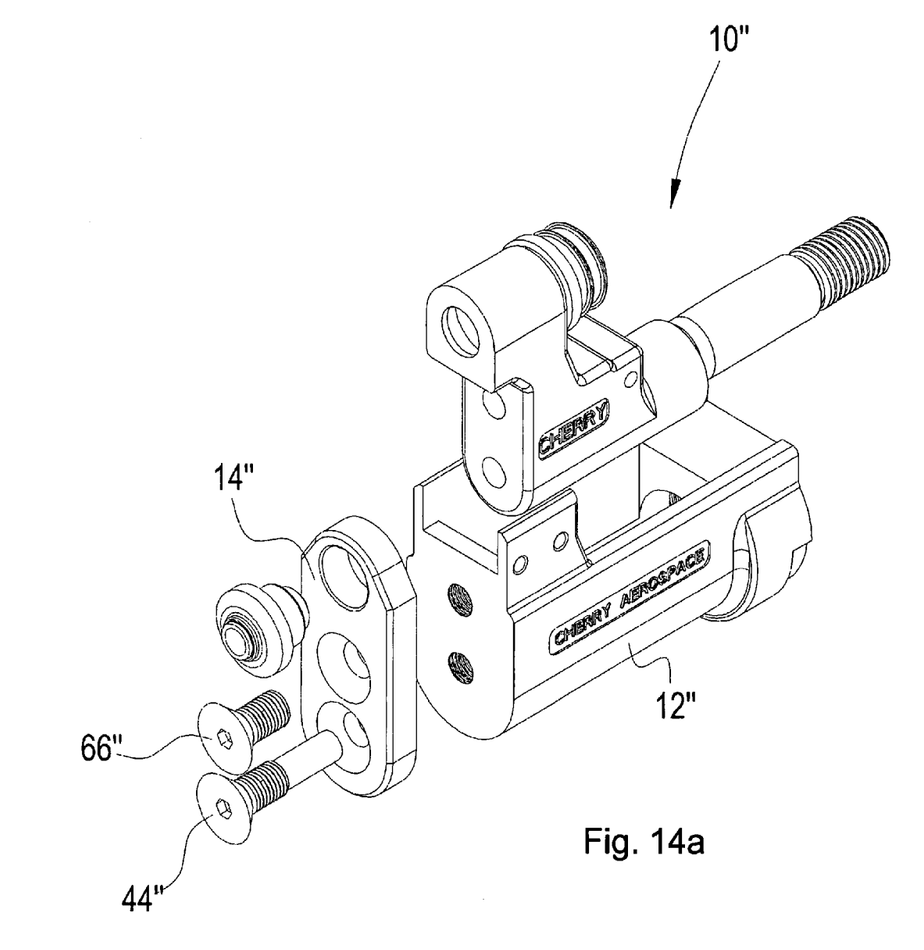

FIGS. 14 and 14a show an alternative embodiment of the pulling head 10". In this embodiment, stationary guiding member 44" functions as a retention means for attaching front plate 14" to the housing 12" in addition to the existing fastener 66".

While the above is a description of various embodiments of the present invention, further modifications may be employed without departing from the spirit and scope of the present invention. Thus the scope of the invention should not be limited according to these factors, but according to the claims to be filed in the forthcoming utility application.

What is claimed is:

1. A pulling head assembly for exerting an axial pulling force on a fastener member, the fastener member extending through a work piece, the pulling head assembly comprising:
   a housing having a front end and a rear end, the front end and the rear end defining a first axis;
   a drawbolt having an upper section and a lower section, the lower section disposed within the housing, the drawbolt connected to an actuation means for axial movement of the drawbolt relative to the housing along the first axis;
   the upper section of the drawbolt comprising a gripping means for engaging the fastener member, the gripping means defining a second axis parallel to the first axis, the lower section comprising a guide member engagement surface; and
   a front plate removably attached to the front end of the of the housing, the front plate comprising a nose piece having an aperture, the axis of the aperture coinciding with the second axis, the front plate further comprising a stationary guiding member axially extending into the housing, wherein the guide member engagement surface of the drawbolt slideably engages a portion of the stationary guiding member as the drawbolt axially moves relative to the housing.

2. The pulling head assembly of claim 1 wherein the gripping means comprises a plurality of jaw members.

3. The pulling head assembly of claim 2 wherein the plurality of jaw members comprises three segments which, when assembled comprise a conical front shape.

4. The pulling head assembly of claim 3 wherein the conical front shape forms an angle greater than forty-five degrees.

5. The pulling head assembly of claim 3 wherein the conical front shape forms an angle of sixty degrees.

6. The pulling head assembly of claim 1 wherein the stationary guiding member is pressed flush into the front plate.

7. The pulling head assembly of claim 1 wherein the front plate comprises a counter-bored aperture, wherein the stationary guiding member is disposed in the counter-bored aperture.

8. The pulling head assembly of claim 1 wherein the guide member engagement surface comprises the inside surface of an axial aperture in the drawbolt.

9. A pulling head assembly for exerting an axial pulling force on a fastener member, the fastener member extending through a work piece, the pulling head assembly comprising:
   a housing having a front end and a rear end, the front end and the rear end defining a first axis;
   a drawbolt having an upper section and a lower section, the lower section disposed within the housing, the lower section comprising a guide member engagement surface, the drawbolt connected to an actuation means for axial movement of the drawbolt relative to the housing along the first axis;
   the upper section of the drawbolt comprising three jaw members configured to form a conical front shape, the conical front shape defining a second axis; and
   a front plate removably attached to the front end of the of the housing, the front plate comprising a nose piece having an aperture, the axis of the aperture coinciding with the second axis, the front plate further comprising a stationary guiding member axially extending into the housing, wherein the guide member engagement surface of the drawbolt slideably engages a portion of the stationary guiding member as the drawbolt axially moves relative to the housing.

10. The pulling head assembly of claim 9 wherein the conical front shape forms an angle greater than forty-five degrees.

11. The pulling head assembly of claim 9 wherein the conical front shape forms an angle of sixty degrees.

12. The pulling head assembly of claim 9 wherein the stationary guiding member is pressed flush into the front plate.

13. The pulling head assembly of claim 9 wherein the front plate comprises a counter-bored aperture, wherein the stationary guiding member is disposed in the counter-bored aperture.

14. The pulling head assembly of claim 9 wherein the guide member engagement surface comprises the inside surface of an axial aperture in the drawbolt.

15. A pulling head assembly for exerting an axial pulling force on a fastener member, the fastener member extending through a work piece, the pulling head assembly comprising:
   a housing having a front end and a rear end, the front end and the rear end defining a first axis, the housing further comprising a nose piece having an aperture, the axis of the aperture defining a second axis, the first axis and second axis being in parallel relationship with one another;
   a drawbolt having an upper section and a lower section, the lower section disposed within the housing, the lower section comprising a guide member engagement aperture having an axis coinciding with the first axis, the drawbolt connected to an actuation means for axial movement of the drawbolt relative to the housing along the first axis;
   the upper section of the drawbolt comprising three jaw members configured to form a conical front shape, wherein the conical front shape forms an angle greater than forty-five degrees, the conical front shape defining an axis coinciding with the second axis; and
   a front plate removably attached to the front end of the of the housing, the front plate comprising a stationary guiding member axially extending into the housing, wherein the guide member engagement aperture of the drawbolt slideably engages a portion of the stationary guiding member as the drawbolt axially moves relative to the housing.

16. The pulling head assembly of claim 15 wherein the conical front shape forms an angle of sixty degrees.

17. The pulling head assembly of claim 15 wherein the stationary guiding member is pressed flush into the front plate.

18. The pulling head assembly of claim 15 wherein the front plate comprises a counter-bored aperture, wherein the stationary guiding member is disposed in the counter-bored aperture.

* * * * *